J. JACK, Jr.
TREE SAWING MACHINE.
APPLICATION FILED MAR. 18, 1913.
1,089,341.
Patented Mar. 3, 1914.
4 SHEETS—SHEET 3.
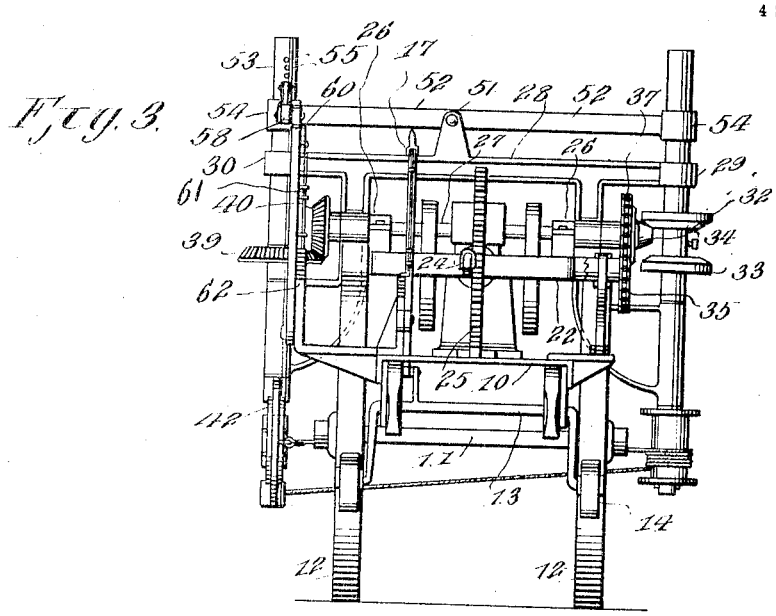
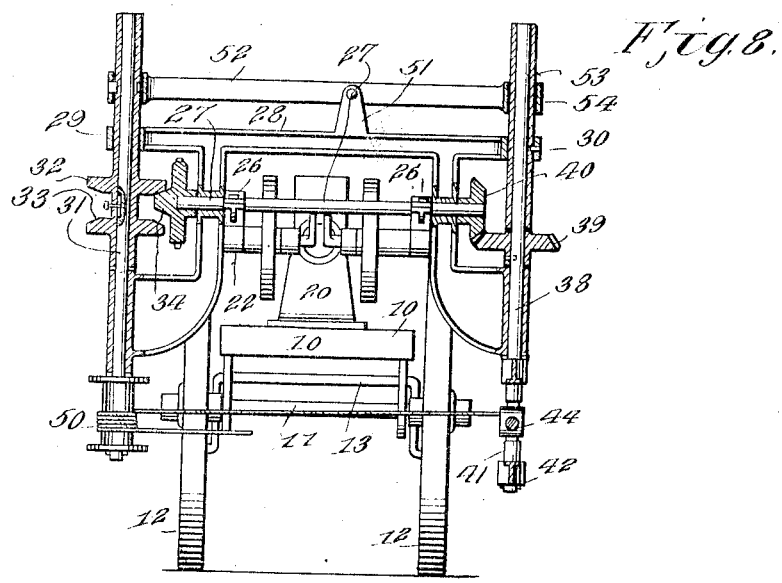
Witnesses
Frank Hough
F. O. Parker
Inventor
John Jack, Jr
By Victor J. Evans
Attorney

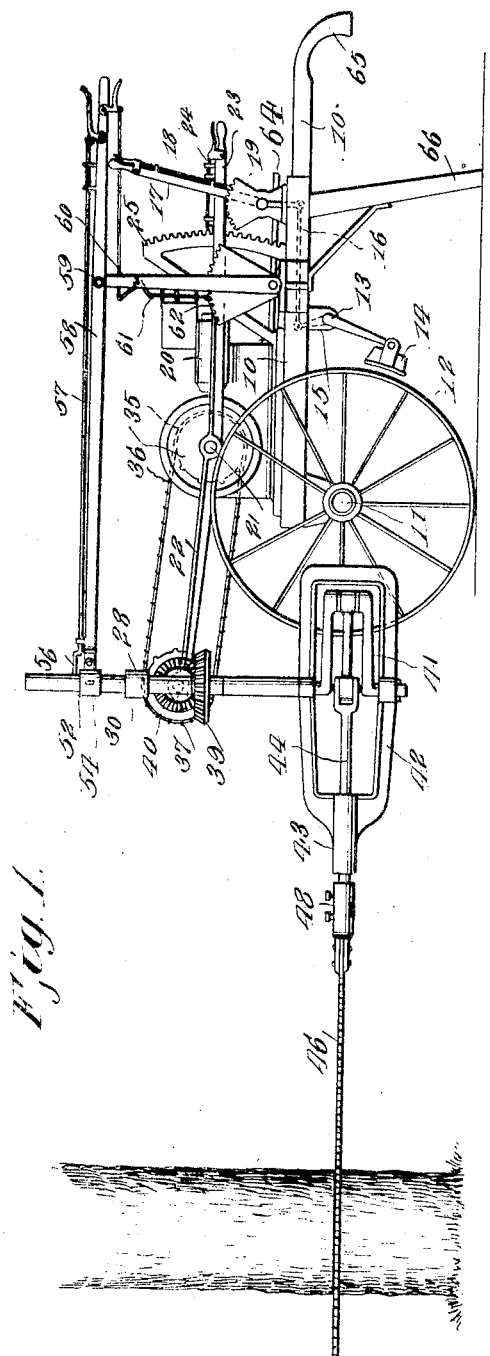

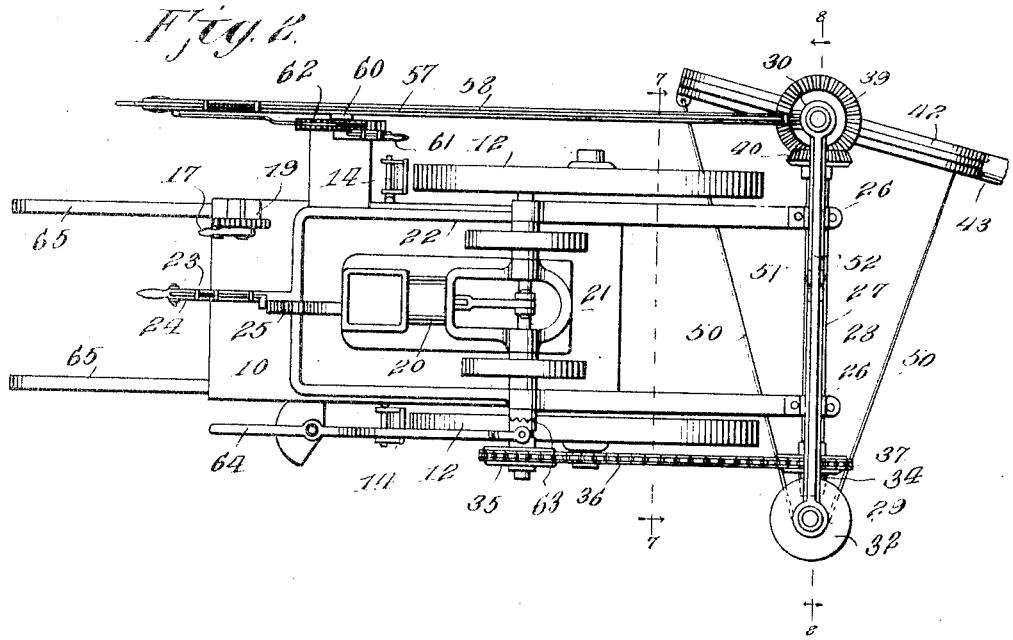
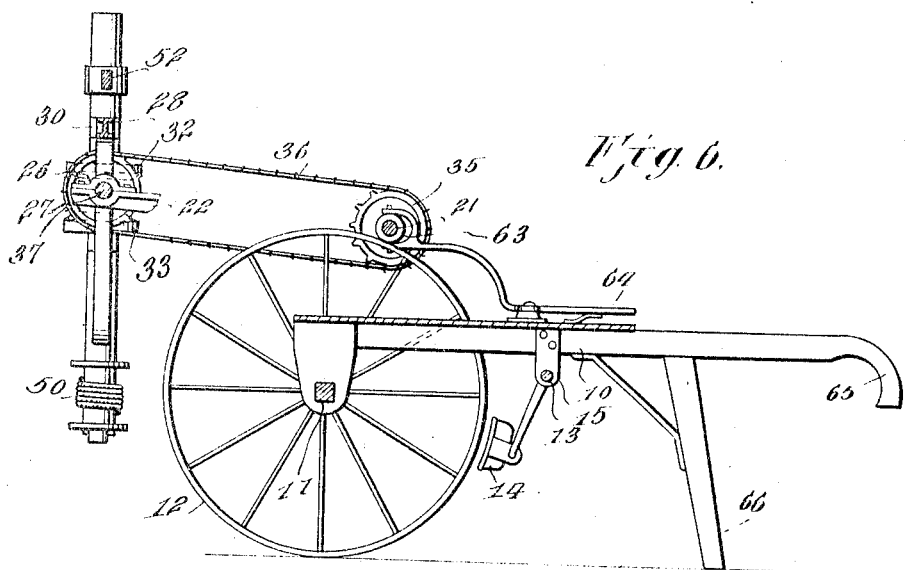

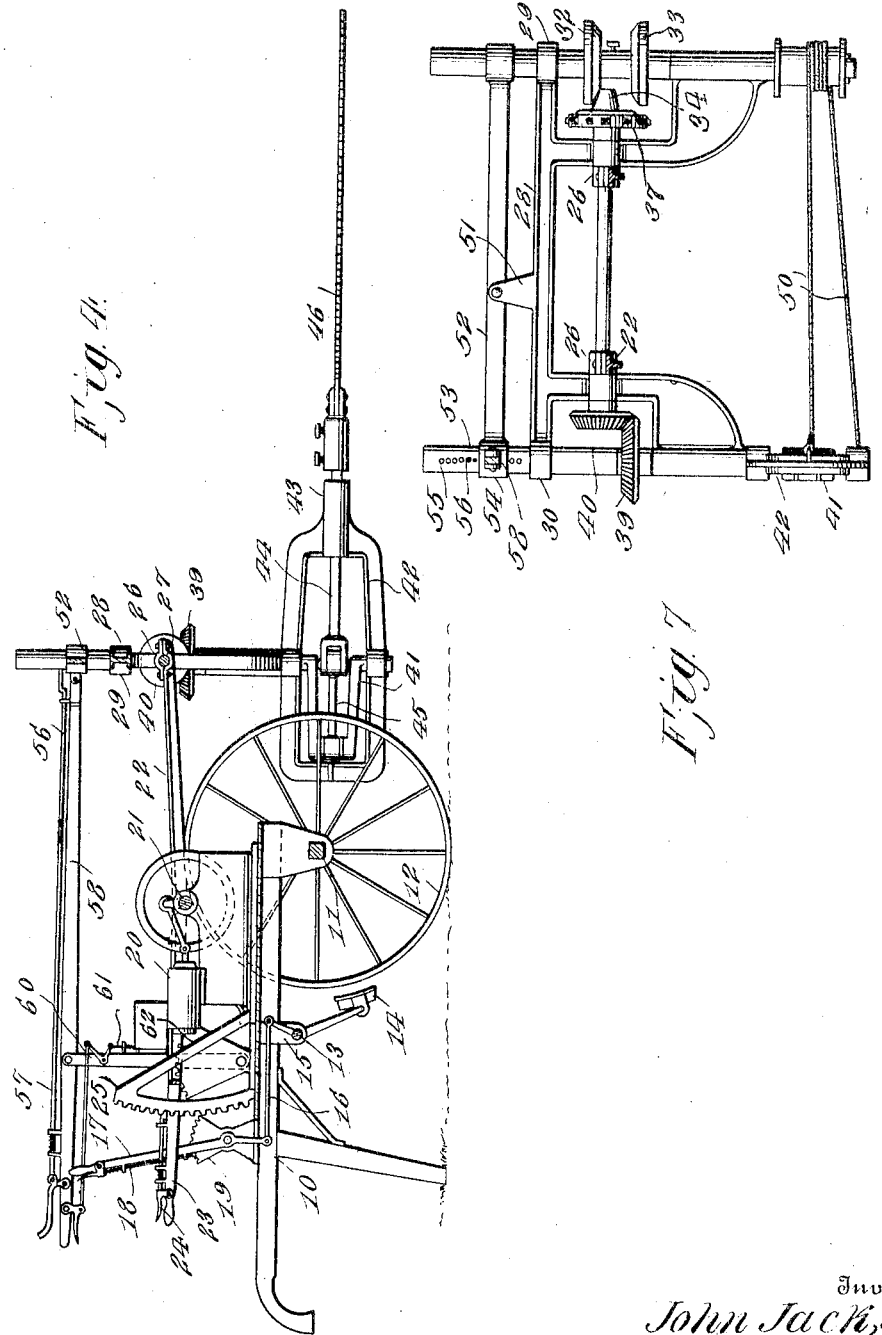

UNITED STATES PATENT OFFICE.

JOHN JACK, JR., OF JACK, MISSOURI.

TREE-SAWING MACHINE.

1,089,341.  Specification of Letters Patent.  Patented Mar. 3, 1914.

Application filed March 13, 1913. Serial No. 755,193.

*To all whom it may concern:*

Be it known that I, JOHN JACK, Jr., a citizen of the United States, residing at Jack, in the county of Dent and State of Missouri, have invented new and useful Improvements in Tree-Sawing Machines, of which the following is a specification.

The invention relates to a sawing machine and more particularly to the class of tree or log sawing machines.

The primary object of the invention is the provision of a machine of this character in which a tree can be readily felled, the saw being easily and conveniently adjusted and operated from a motor supported upon the frame of the machine.

Another object of the invention is the provision of a machine of this character which can be moved from one point to another, and is capable of felling trees or cutting logs into different lengths, the saw also capable of being driven through the medium of a motor which may be started and stopped at will.

A further object of the invention is the provision of a machine of this character which is simple in construction.

With these and other objects in view the invention consists in the construction, combination and arrangement of parts as will be hereinafter more fully described, illustrated in the accompanying drawings, and pointed out in the claims hereunto appended.

In the drawings: Figure 1 is a side elevation of a machine constructed in accordance with the invention the same being shown in position for felling a tree. Fig. 2 is a top plan view thereof. Fig. 3 is an end elevation. Fig. 4 is a vertical longitudinal sectional view through the same. Fig. 5 is a side elevation of the machine shown in position for cutting a log. Fig. 6 is a view similar to Fig. 4 looking toward the opposite end thereof. Fig. 7 is a vertical transverse sectional view on the line 7—7 of Fig. 2. Fig. 8 is a sectional view on the line 8—8 of Fig. 2.

Similar reference characters indicate corresponding parts throughout the several views in the drawings.

Referring to the drawings by numerals, the machine comprises a wheelbarrow frame 10 including a stationary axle 11 having journaled thereon supporting wheels 12 and supported upon the frame 10 is a brake beam 13 carrying brake shoes 14 which are adapted to be thrown into and out of engagement with the tread of the wheels 12 for the braking thereof, the beam 13 being held within bearings 15 carried by the frame and having connected thereto a shift rod 16, the same being connected to a throw lever 17 carrying a manually controlled spring held latch device 18 adapted for engagement with a toothed segment 19, fixed to the frame 10 of the machine.

Mounted upon the frame 10 centrally thereof is a gasolene motor or engine 20 having a driving shaft 21 which is horizontally disposed and upon which latter is fulcrumed a raising and lowering yoke 22 which is formed with a lever extension 23 whereby the said yoke may be swung to raised or lowered position, the lever extension being provided with a manually controlled spring held locking device 24, which is engageable with a toothed segment 25, mounted on the base of the motor or engine 20 at one side thereof so that when the yoke has been adjusted it may be locked or held fast in such position. Formed in the ends of the yoke 22 are bearings 26, in which is journaled a driven shaft 27 on which is supported a rocking frame 28 provided with bearings 29 and 30 respectively, and in the bearings 29 of which is journaled a counter-shaft 31 which is arranged at right angles to the shaft 27 and has fixed thereto spaced opposed friction gears 32 and 33 respectively, either of which is adapted to engage with a friction pinion 34 secured to one end of the driven shaft 27, so that the said counter shaft can be rotated in reverse direction, the countershaft 31 being shifted in the frame 28 in a manner presently described.

Suitably fixed to the shaft 21 of the engine is a sprocket wheel 35 over which is trained a sprocket chain 36, the same being also trained over a sprocket wheel 37 fixed to the driven shaft 27, so that on the starting of the engine or motor 20 rotary motion will be imparted from the driven shaft 27 to the counter-shaft 31, the friction gears 32 and 33 being designed to control the direction of rotation of the latter.

Journaled in the bearings 30 is a rotatable shaft 38 having fixed thereto a beveled gear 39, the same meshing with a beveled pinion 40, fixed to the driven shaft 27, so that motion from the latter will be imparted to the said shaft 38 for operating a saw in the manner presently described. The shaft 38 near its lower end is formed with a crank 41 and swingingly connected to the shaft 38 at opposite sides of the said crank 41 is a guide frame 42 in one end of which is formed a guide sleeve 43 through which works a slide rod 44, the latter being loosely connected to a link 45 which is also loosely connected to the crank 41 and on the outer end of the said slide rod 44 is carried a saw blade 46 the same being outwardly tapered and is provided with saw teeth 47 at opposite longitudinal edges thereof, the blade 46 being formed with a collar 48 fitting upon the slide rod 44 and carrying a set screw whereby the said collar 48 may be locked upon the slide rod so that the saw can be sustained in its adjusted position for cutting logs or for felling trees.

The guide frame 42 is adapted to swing upon the shaft 38 and to accomplish this there is connected to the said frame 42 the ends of a flexible cable 50, the said ends of the cable being connected at points opposite the axis of movement of the frame and this cable is wound about the counter-shaft 31 near the lower end thereof so that on rotating the latter in one direction it will cause the swinging of the frame 42 in one direction and on the turning of the counter-shaft 31 in the reverse direction the said frame will be swung in the opposite direction and in this manner the saw is fed into the work during the cutting operation thereof.

Formed on the rocking frame 28 is an extension forming a bearing 51 in which is pivotally mounted a rocking lever 52, the same being loosely connected at one end to the counter-shaft 31, so that upon movement of the lever 52, the said shaft may be raised or lowered for bringing the friction gears 32 and 33 alternately into engagement with the friction pinion 34 for reversing the action of the saw. Stationarily fitted about the shaft 38 at the upper end thereof is a sleeve 53 which is held fast in the bearing 30 of the frame 28 and loosely engaged with this sleeve is the loop terminal 54 of the other end of the rocking lever 52, the sleeve being formed with spaced vertically disposed openings 55, in any one of which is adapted to engage a locking pin 56, the matter being controlled through the medium of a manually operated spring held latch device 57 which is supported upon a throw lever 58 the same being connected to the rocking lever 52 and being also engaged in a bearing 59 formed in the upper end of a throw lever 60, the latter being pivotally connected to the frame 10 and carrying a manually controlled spring held latch device 61, which is adapted to engage a toothed segment 62 formed on or mounted upon the said frame 10, the lever 58 being designed to rock the lever 52 so as to shift the shaft 31 for bringing the friction gears 32 and 33 into engagement with the friction pinion 34 and thereby effecting the reversing of the action of the saw as may be desired. The locking pin 56 will serve to hold the friction gears 32 and 33 out of engagement with the friction pinion 34 or will hold either of said gears engaged therewith as will be readily apparent.

The lever 60 is designed to rock the frame 28 and the same is sustained in its adjusted position by means of the latch device 61 hereinafter described. On adjusting the rocking frame 28 the angular disposition of the saw may be attained. On swinging the yoke 22 the same frame 28 can be raised or lowered with respect to the ground and in this manner the saw can be brought into proper working position with respect to the work to be cut thereby. The sprocket wheel 35 is locked and unlocked from the shaft 21 through the medium of a clutch 63 which is actuated through a hand lever 64 so that the action of the saw can be stopped and started at will, the engine being controlled in the ordinary well-known manner. The wheelbarrow frame is formed with the usual handles 65 and also with props or legs 66 so that the machine can be wheeled by hand and brought to rest in the same manner as an ordinary wheelbarrow.

From the foregoing description taken in connection with the accompanying drawings it is thought that the construction and operation of the invention will be clearly understood, and therefore a more extended explanation has been omitted.

What is claimed is:

1. A portable reciprocating sawing machine comprising a frame, a motor supported upon said frame and having a horizontal driving shaft, a yoke fulcrumed upon said shaft, a driven shaft journaled in said yoke, a rocking frame supported upon said driven shaft for rocking in a vertical plane, connections between the driving and driven shafts, a crank shaft vertically journaled in the rocking frame, a guide frame supported by said crank shaft, a guide rod mounted in said guide frame and having connection with the crank shaft for operation thereby, a saw blade connected with the outer end of said guide rod and adjustable about a longitudinal axis, means for adjusting the rocking frame, means for adjusting the yoke, means for swinging the guide frame, and reversing connections between the last-named means and the driven shaft.

2. A portable reciprocating sawing machine comprising a frame, a motor supported upon said frame and having a horizontal driving shaft, a yoke fulcrumed upon said shaft, a driven shaft journaled in said yoke, a rocking frame supported upon said driven shaft for rocking in a vertical plane, connections between the driving and driven shafts, a crank shaft vertically journaled in the rocking frame, a guide frame supported by said crank shaft, a guide rod mounted in said guide frame and having connection with the crank shaft for operation thereby, a saw blade connected with the outer end of said guide rod and adjustable about a longitudinal axis, means for adjusting the rocking frame, means for adjusting the yoke, and means for swinging the guide frame, reversing connections between the last-named means and the driven shaft, said means for swinging the guide frame being mounted on the rocking frame.

In testimony whereof I affix my signature in presence of two witnesses.

JOHN JACK, Junior.

Witnesses:
H. H. MEDLOCK,
H. A. YOUNGE.